United States Patent
Chalmet et al.

(10) Patent No.: US 9,284,977 B2
(45) Date of Patent: Mar. 15, 2016

(54) FRONT BEARING SECTION OF HOUSING OF COMBUSTION ENGINE STARTER HAVING OUTPUT PINION

(75) Inventors: Alexis Chalmet, Lyons (FR); Thierry Paltrie, Lyons (FR)

(73) Assignee: Valeo Equipements Electriques Moteur (FR)

( * ) Notice: Subject to any disclaimer, the term of this patent is extended or adjusted under 35 U.S.C. 154(b) by 497 days.

(21) Appl. No.: 13/635,545

(22) PCT Filed: Mar. 21, 2011

(86) PCT No.: PCT/FR2011/050571
§ 371 (c)(1),
(2), (4) Date: Nov. 30, 2012

(87) PCT Pub. No.: WO2011/124798
PCT Pub. Date: Oct. 13, 2011

(65) Prior Publication Data
US 2013/0074618 A1    Mar. 28, 2013

(30) Foreign Application Priority Data
Mar. 29, 2010    (FR) .................................... 10 52272

(51) Int. Cl.
F16C 33/66    (2006.01)
F16C 19/06    (2006.01)
F16C 35/04    (2006.01)
F02N 15/06    (2006.01)
F16C 33/78    (2006.01)

(52) U.S. Cl.
CPC .............. F16C 19/06 (2013.01); F02N 15/067 (2013.01); F16C 33/6607 (2013.01); F16C 33/7886 (2013.01); F16C 35/042 (2013.01); F02N 2250/08 (2013.01); Y10T 74/13 (2015.01)

(58) Field of Classification Search
CPC ............. F02N 2250/08; F16C 33/6607; F16C 33/7886; F16C 35/04; F16C 35/042
USPC .......... 74/6, 7 A, 7 R; 384/462, 466, 473, 484
See application file for complete search history.

(56) References Cited

U.S. PATENT DOCUMENTS

| | | | | |
|---|---|---|---|---|
| 2,249,501 A | * | 7/1941 | Teker | 384/474 |
| 2,337,403 A | * | 12/1943 | Myers et al. | 384/473 |
| 4,995,275 A | * | 2/1991 | Okamoto et al. | 74/7 A |
| 5,001,377 A | * | 3/1991 | Parkinson | 310/90 |
| 5,054,329 A | * | 10/1991 | Morishita et al. | 74/7 R |
| 6,845,681 B2 | * | 1/2005 | Murata et al. | 74/6 |

FOREIGN PATENT DOCUMENTS

| | | | | |
|---|---|---|---|---|
| DE | 1 168 185 B | * | 4/1964 | .......... F16C 33/6607 |
| FR | 2764946 | | 12/1998 | |

* cited by examiner

*Primary Examiner* — William Kelleher
*Assistant Examiner* — Bobby Rushing, Jr.
(74) *Attorney, Agent, or Firm* — Berenato & White, LLC

(57) ABSTRACT

The front bearing (110) of a heat engine starter having an output pinion starter drive (120) comprises, in the front, a transverse wall (111) having an opening (112), for passing a body (122) of the starter drive (120) there through, and a cavity (200) for mounting a sealing joint (240). The cavity is set up on the inner periphery of the rear surface (400) of the front bearing. The rear surface is configured so as to form a bearing abutment for the outer ring (231) of a rolling bearing (230) and moreover has at least one hollowed-out area (300) intended to be filled with grease so as to form a grease supply. The hollowed-out area is mostly set up outside the cavity. A heat engine starter having an output pinion is characterized in that it comprises one such front bearing.

15 Claims, 4 Drawing Sheets

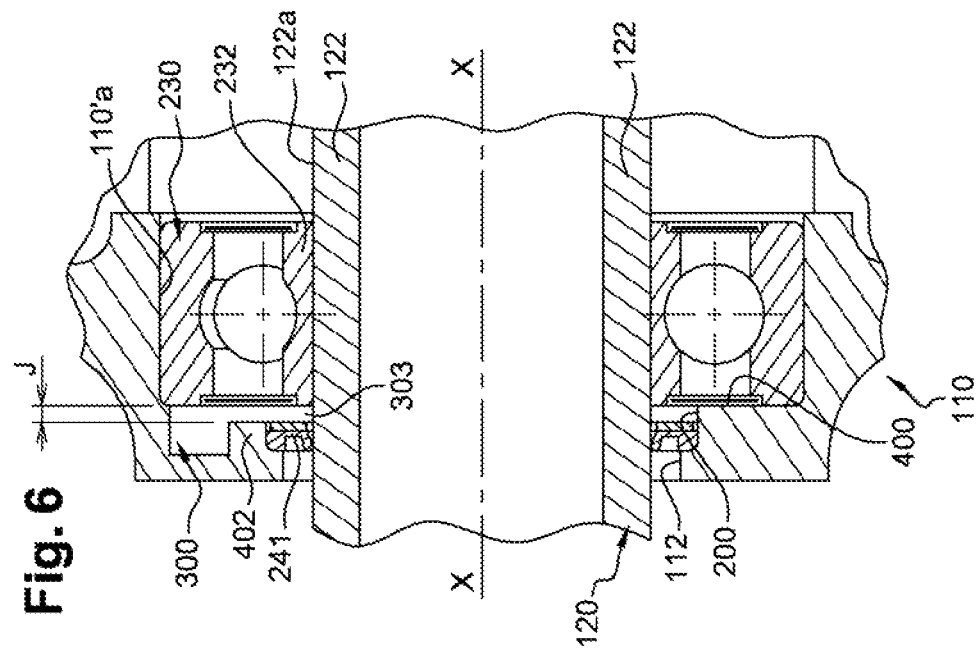
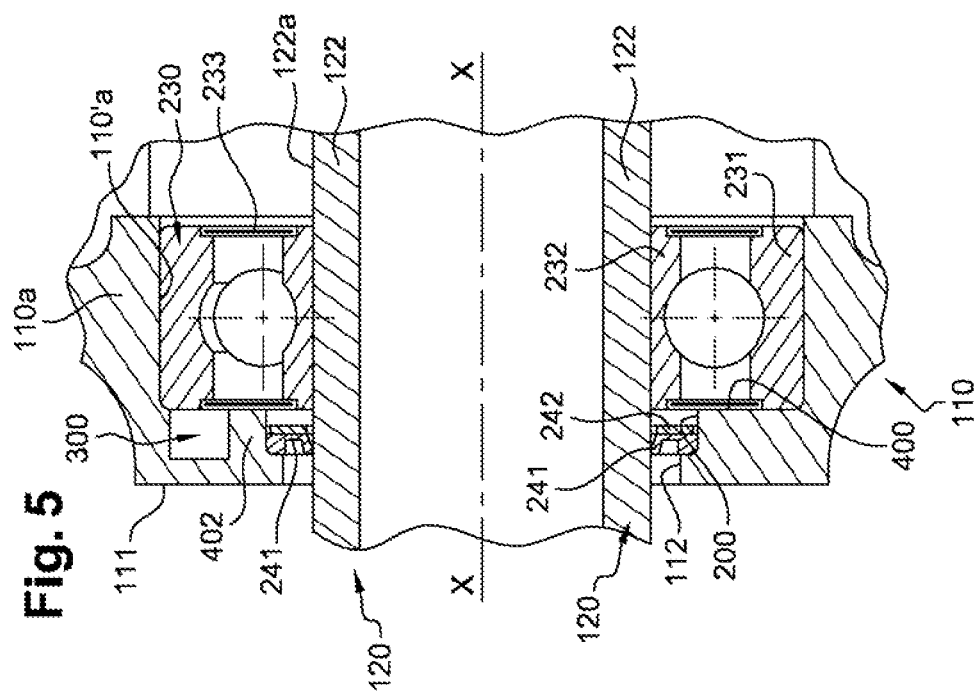

FRONT BEARING SECTION OF HOUSING OF COMBUSTION ENGINE STARTER HAVING OUTPUT PINION

CROSS-REFERENCE TO RELATED APPLICATIONS AND CLAIMS TO PRIORITY

This application is a national stage application of International Application No. PCT/FR2011/050571 filed Mar. 21,2011, which claims priority to French Patent Application No. 10/52272 filed Mar. 29,2010, of which the disclosures are incorporated herein by reference and to which priority is claimed.

FIELD OF THE INVENTION

The invention relates to a front bearing section of a combustion engine starter provided with a starter head having an output pinion, in particular for a motor vehicle, and a starter having an output pinion, in particular for a motor vehicle, comprising such a bearing section.

STATE OF THE ART

Such a starter is described in the documents FR 2 764 946, U.S. Pat. No. 4,995,275 and U.S. Pat. No. 5,101,114 to which reference will be made for further details.

As can be seen in the document U.S. Pat. No. 5,101,114, this starter comprises a housing within which is mounted an electric motor of which the shaft is designed to rotatably drive an output shaft of the starter carrying and meshing with a driver belonging to a starter head comprising an output pinion.

Depending on the application, the output shaft of the starter is, as in the document U.S. Pat. No. 5,101,114, combined with the shaft of the electric motor or, as seen in the documents FR 2 764 946 and U.S. Pat. No. 4,995,275, separate from the shaft of the electric motor.

The starter housing comprises a front bearing section configured for attaching the starter on a fixed part, a frame and a rear bearing for rotatably mounting the rear end of the shaft of the electric motor. The frame carries the inductor, such as magnets or windings, of the electric motor surrounding a wound armature integral with the motor shaft. The frame is interposed axially between the front and rear bearings. As can be seen in FIG. 1 which is a partial diagrammatic view in lengthwise cross-section of a starter with output pinion identical to FIG. 1 of document FR 2 764 946, the starter head 120 of this type of starter 100 has at its front end a cylindrical main body 122 passing through a circular opening 112 in the front bearing section 110 formed in a front transverse wall 111 of this bearing section 110. The pinion 121 is referred to as an output pinion because it is disposed outside the bearing section 110 on the body 122 of the starter head 120. In this embodiment the body 122 is in the form of a bush and constitutes the main body of the pinion 121 in a single piece with the body 122, which is made of metal and is of great hardness as the rear of the body constitutes the inner track of the roller free wheel 124 interposed between the body 122 and the rear end 123 of the starter head 120 constituting a driver.

The output shaft 125 of the starter penetrates inside this main body 122. Bearing means 126, here in the form of sleeve bearings, are provided between the outer periphery of the output shaft 125 and the inner periphery of the body 122 in the form of a bush for axially guiding the main body 122. In a variant, the sleeve bearings 126 are replaced by needle bearings. In FIG. 1 the axis X-X constitutes the axial axis of symmetry of the body 122 and of the output shaft 125. References 1, 2 and 3 respectively designate a fork, the movable core and the electromagnetic contactor carried by the bearing 110. The fork 1 has fingers received in a groove (not referenced) of the driver 123. This fork is articulated at an intermediate point on a yoke piece 127 overmoulded on an intermediate plate 128 interposed between the rear face of the front bearing 110 and a tank (not referenced) included in the contactor, which extends parallel to the electric motor and to the starter head 120. In FIG. 1 can be seen one of the screws for fixing the tank of the electromagnetic contactor 3 to the front bearing 110 of hollow form.

The plate 128 carries an epicyclic reduction gear 129 interposed between the shaft 131 of the electric motor and the output shaft 125 of the starter. The output shaft 125 and the driver 123 have splines and complementary helical grooves respectively on their outer and inner periphery. The starter head 120 and the pinion 121 can thus move axially and rotationally when the fork 1 acts on the driver 123.

The starter head 120 and the pinion 121 are therefore intended to be moved axially between an idle position, seen in FIG. 1, and a forward position for meshing with a toothed starting ring 221 connected direct or resiliently to the crankshaft of the combustion engine to be started. In this forward position the ring gear is rotatably driven by the electric motor when the latter is powered electrically.

More precisely, the fork 1 is designed to be pivotably actuated by the movable core 2 of the electromagnetic contactor 3, which in this case is of the type described for example in the documents WO 2004/088126 and WO 03/002870 to which reference will be made for more details. In FIG. 1 this fork is connected, as shown in FIG. 6 of WO 2004/088126, at its upper end pivotably to a rod connected resiliently the movable core of the contactor configured to act on a pusher, in the form of a rod, carrying a movable contact, in the form of a plate, arranged to come into contact with two power supply terminals for powering the electric motor of the starter in order to rotatably drive the starting ring of the combustion engine when the pinion 121 and the main body 122 of the starter head 120 are in the forward position and in engagement with the starting ring 221.

One of the terminals is intended to be connected to the positive terminal of the battery of he motor vehicle. The other terminal is intended to be electrically connected to the electric motor of the starter.

The contactor also includes a fixed core, at least one coil and also springs, in particular return springs to return the movable core to the idle position. When the driver actuates the ignition key or inserts a starting card, a contact is caused to close and the contactor coil is electrically energized so that the movable core is moved towards the fixed core and moves the fork and the pusher. The starter head 120 is moved axially and rotatably by the pivoting of the fork 1. At the end of a given travel the movable contact comes into electrical contact with the power supply terminals and the electric motor is electrically energized and causes the output shaft of the starter to turn. The pinion then occupies a forward position of meshing with the starting ring 221 of the combustion engine.

The main body 122 is guided axially by a bearing 130 acting between the outer periphery of the main body 122 and the inner periphery 110'a of a sleeve 110a, provided at the front of the bearing 110. The internal bore of the sleeve 110a is stepped in diameter. It is open at the rear and delineated at the front by the front transverse wall 111 of the bearing 110. This wall 111 forms part of the front face of the bearing 110. The opening 112 in the wall 111 therefore belongs to the internal bore of the sleeve 110 and constitutes the smallest diameter of the internal bore of the sleeve 110a. The bearing 130 can consist of a needle bearing, as in the document FR 2 764 946, or a ball bearing as in the documents U.S. Pat. No. 4,995,275 and U.S. Pat. No. 5,101,114, or a roller bearing.

In the documents cited hereinabove there is provided a sealing joint serving to prevent the penetration of dust, other contamination or water loaded with corrosive elements, which could degrade the friction surfaces between the bearing 130 and the body 122 of the starter head. This seal is designated by reference 140 in FIG. 1. It is positioned in the bearing 110 at the level of the opening 112. It is interposed between the rear face of the wall 111 and the front face of the needle bearing 130. The inner periphery of the seal cooperates with the outer periphery of the body 122 to create the abovementioned sealing tightness and to protect the outer periphery of the body 122 and the inner periphery of the bearing 130.

The wall 111 therefore constitutes a shoulder for the seal 140. The outer periphery of the bearing 130 is in contact with the inner periphery 110'a of larger diameter of the internal bore of the sleeve 110a.

It is desirable to further improve the sliding of the body 122. For this purpose provision is made in the document U.S. Pat. No. 4,995,275 to form grooves at the inner periphery of the inner ring of the ball bearing, constituting the bearing means. These grooves are filled with grease. There is thus created an oil film between the inner ring and the outer periphery of the main body of the starter head, which is thus able to slide more easily. In addition the wear on the inner ring of the bearing is reduced.

This solution poses a problem in that the filling of the grooves with grease is not as simple as desired.

Object of the Invention

The object of the invention is to resolve this problem.

According to the invention a front bearing of a combustion engine starter equipped with a starter head with an output pinion, in particular for a motor vehicle, of the type comprising at the front a transverse wall provided with an opening for the passage of a body of the starter head therethrough, an annular cavity formed in the rear face of the transverse wall at the inner periphery of the latter for mounting a sealing joint, in which the rear face of the transverse wall is configured so as to form a bearing abutment for the outer ring of a bearing, is characterised in that this rear face presents at least one hollowed-out area designed to be filled with grease to form a grease supply and in that the hollowed-out area is set up at least for the most part, i.e., generally, outside the cavity.

According to the invention a starter with output pinion, in particular for a motor vehicle, comprises a housing with a front bearing section according to the invention.

The invention therefore makes it possible to simplify the formation and filling of the grease supply.

It also makes it possible to improve the sliding of the starter head body and therefore to increase the service life and the reliability of the starter due to the presence of the grease supply which is capable of containing a larger quantity of grease.

According to other features taken alone and/or in combination:
- the cavity is equipped with a seal comprising at least one forwardly inclined lip;
- the seal includes an elastomer portion at the front and a reinforcing washer at the rear;
- the axial length of the cavity is greater than or substantially equal to the thickness of the seal;
- the front bearing section internally presents a cylindrical inner face of axial orientation connecting to the outer periphery of the rear face of the transverse wall for forming a recess;
- the front bearing section is equipped with a bearing comprising an outer ring;
- the bearing is mounted in the recess;
- the cavity is axially offset towards the front in relation to the bearing;
- an axial clearance exists between the rear face of the seal and the front face of the bearing;
- at least one passage for the grease exists between the hollowed-out area and the front face of the bearing;
- the passage includes at least one channel;
- the hollowed-out area is blind;
- the outer periphery of the outer ring is in tight contact with the inner cylindrical face of the recess;
- the inner face of the wall constitutes a bearing abutment for the front face of the outer ring;
- the bearing consists of a sealed ball bearing;
- the hollowed-out area is formed at the outer periphery of the inner face and locally affects the bearing abutment of the front face of the outer ring;
- the hollowed-out area extends circumferentially substantially through 120°;
- the hollowed-out area is formed in the upper portion of the inner face closest to the outer periphery of the front bearing;
- the hollowed-out area is delineated internally by at least one band of material defining with the lateral edges of the hollowed-out area at least one channel;
- the channel or channels emerge into the cavity;
- the hollowed-out area consists of an annular groove;
- the cavity is delineated by a section of orientation of the all of transverse orientation, which is notched at the rear locally by the channel or channels.

By virtue of the invention the bearing, preferably sealed, is not modified. It is therefore possible to use a ball bearing or a roller bearing of the standard type. The grease supply is easy to fill and is masked by the bearing so that the front bearing fitted with its seal, its bearing and its grease supply forms an assembly that can be handled and transported without risk of leakage or contamination of the grease. The grease supply is economical in that the hollowed-out area is easy to form for example by casting or machining.

The grease flows progressively by gravity and makes it possible to provide lubrication and corrosion protection for the interface between the main body of the starter head and the ball bearing so that the service life of the starter is extended.

In a particular embodiment the seal is simplified relative to that of documents FR 2 764 946 and U.S. Pat. No. 4,995,275.

Other features and advantages of the invention will become apparent on reading the following description with reference to the accompanying drawings.

BRIEF DESCRIPTION OF THE DRAWINGS

FIG. 5 is a full sectional view of FIG. 4 with a partial representation of the main body in the form of a bush of the starter head;

FIG. 6 is a view on line 6-6 of FIG. 3 with a partial representation of the main body of the starter head with output pinion;

DESCRIPTION OF EXAMPLE EMBODIMENTS OF THE INVENTION

In FIGS. 2 to 8 the elements common to the invention and to those of the document FR 2 764 946 are assigned the same references.

Figure 1:
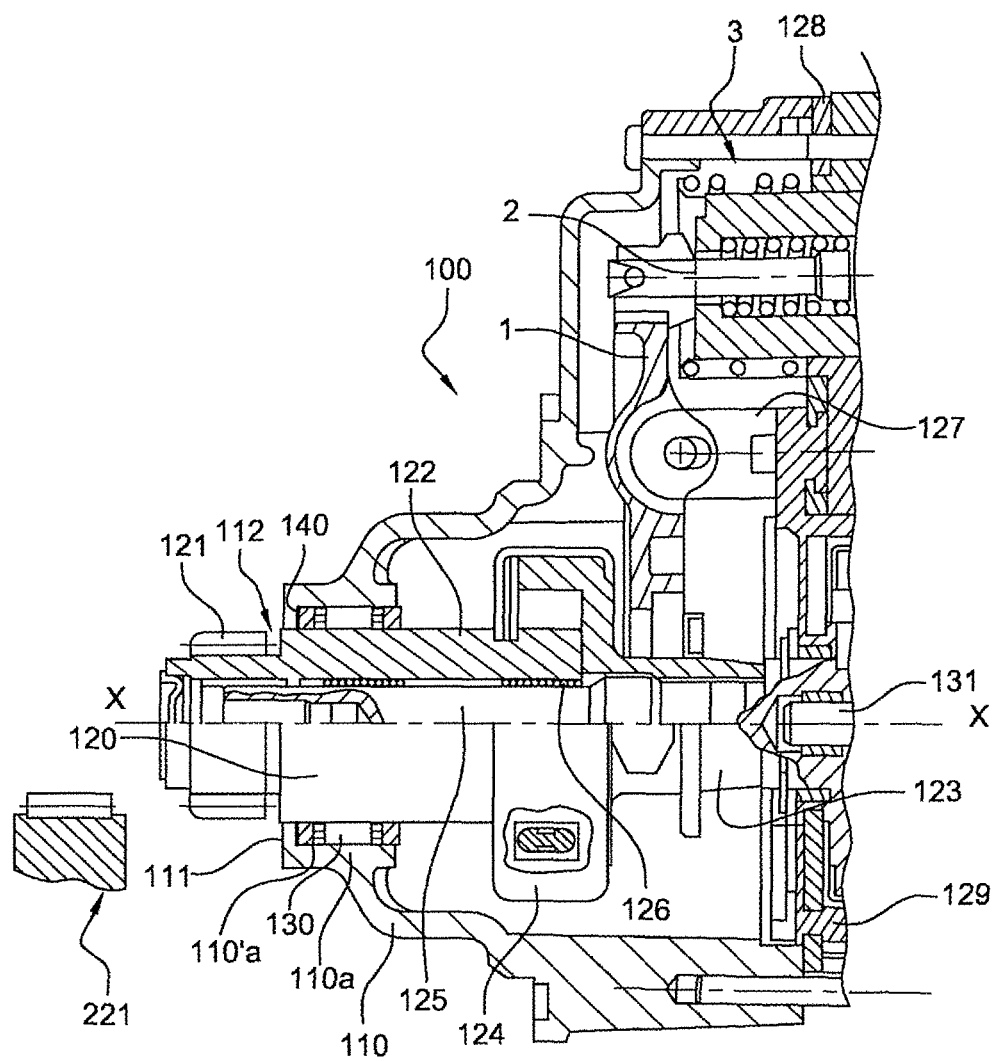
FIG. 1 is a partial diagrammatic view in lengthwise cross-section of a starter with output pinion of the prior art.

In the remainder of the description, on one hand, an orientation from back to front corresponds in FIG. 1 to an orientation from right to left and, on the other hand, the transverse, axial and radial orientations will be defined relative to the axis X-X, which is the axial axis of symmetry of the starter head 120 and of the output shaft of the starter. This axis also defines the center of the opening 112 formed centrally in the front transverse wall 111, which is provided at the front of the front bearing section 110. The wall 111 belongs to the front face of the front bearing 110 section. The opening 112 allows the body 122 of the starter head 120 with output pinion to pass therethrough.

In FIGS. 2 to 8 the general structure of the starter 100 of FIG. 1 is retained. Thus no modification is made to the starter head 120 with metal main body 122 in the form of a bush, the shaft 131 of the electric motor, the splined connection with complementary helical grooves between the shaft 131 and the driver 123, the reduction gear 129 provided between the shafts 131 and 125, the electromagnetic contactor 3, carried by the front bearing section 110, and the fork 1 articulated on the yoke piece 127 of the plate 128 and connecting the movable core 2 of the contactor 3 to the driver 123 of the starter head.

The front bearing section 110 of the starter housing is retained for the most part.

The front part of the front bearing section 110 of the starter housing is modified, according to a particular feature, at the level of its front transverse wall 111. This wall 111 is thickened and the rear face 400, that is to say the inner face, of this wall 111 is hollowed out to form an annular cavity 200 for receiving and holding an annular lipped seal 240, and for forming at least one hollowed-out area 300, 1300 filled with grease to form a grease supply so as to lubricate the outer periphery of the main body 122 of the starter head 120.

The hollowed-out area is blind by the fact that this hollowed-out area is formed in the rear face 400, which is hollowed out for this purpose.

The mechanical strength of the front bearing section is not unduly affected by the cavity 200 and the hollowed-out area 300, 1300 because the wall 111 is thickened relative to that described in the document FR 2 764 946.

In addition the hollowed-out area is capable of being filled with a large quantity of grease.

The cavity 200 is formed at the inner periphery of the wall 111 delineated by the circular opening 112. The cavity 200 is therefore open centrally. The bearing 110 is of hollow shape and is metallic. The axis X-X is the axis of the annular cavity 200.

The cavity 200 is of axial orientation and is delineated at the front by a transversely oriented annular portion of the wall 111 emerging in the opening 112. This portion reduces the thickness of the wall 111 at the level of the cavity 200 and is extended at its outer periphery by an axially oriented cylindrical portion of the wall 111. This cylindrical portion is directed towards the inside of the bearing 110. The diameter of the inner face of this cylindrical portion is greater than the diameter of the circular opening 112 so that the internal bore of the wall 111 is stepped in diameter. In this case the bearing 110 is made of aluminium so as to obtain the desired shapes. The cavity 200 is obtained by casting or alternatively by machining. The same applies to the hollowed-out area 300, 1300.

The bearing 110 is fitted with the lipped seal 240, which is tightly fitted in its retaining cavity 200 and comprises at the front an elastomer portion 241 and at the rear a metal reinforcing washer 242.

The elastomer portion is massive at its outer periphery. This peripheral part cooperates with the transversely oriented portion and the axially oriented cylindrical portion, which delineate the cavity 200.

The rear face of the transversely oriented portion of the cavity 200 constitutes a bearing abutment for the front face of the massive elastomer portion 241 of the seal 240. This abutment is an axial abutment of annular shape.

The elastomer portion 241 cooperates at its outer periphery in tight contact with the inner face of the cylindrical portion delineating the cavity 200.

The elastomer portion 241 of the seal 240, of annular shape, is provided at its inner periphery with an inwardly projecting lip for leaktight contact (see FIGS. 5, 6, 8) with the outer periphery 122a of the main body 122 in the form of a bush of the starter head 120 presenting at the front the output pinion in a single piece with this body as shown in FIG. 1.

The lip is forwardly inclined so as to better eliminate spray, such as water spray and to protect the inside of the front bearing section 110. The projecting lip extends radially inward in relation to the transversely oriented portion of the cavity. The lip penetrates into the opening 112.

The elastomer portion 241 is integral with the rear of the metal reinforcing washer 242, in this case made of steel. The rear face of the washer 242 constitutes the rear face of the seal 240. The lip extends in radial projection inwardly relative to the washer 242 as can be seen in the Figures.

In the first embodiment of FIGS. 1 to 6, the axial length of the axially oriented portion of the cavity 200 is, according to a particular feature, greater than the thickness of the seal 240.

According to a particular feature, the cavity 200 is axially longer than the thickness of the seal 240 measured axially.

The rear face 400 of the front wall 111 is annular and of transverse orientation. It is holed centrally in favour of the circular opening 112 and of the annular cavity 200 (FIGS. 5 and 6).

This face 400 is extended at its outer periphery by the inner face 110'a of the cylindrical sleeve 110a, which is presented internally by the bearing 110 as shown in FIG. 1. This sleeve 110a extends perpendicularly relative to the wall 111.

The face 110'a is therefore cylindrical and of axial orientation.

The front bearing section 110 thus presents internally an annular recess delineated by the faces 400, 110'a. This recess is dedicated to the mounting of a bearing 230, which consists in this embodiment of a ball bearing of the sealed type.

In FIGS. 5 to 8 the front bearing section 110 is equipped with this bearing 230 provided with an outer ring 231 fitted tightly in the recess 400, 110'a. The cavity 200 is axially offset towards the front in relation to the bearing 230.

The front face of the bearing 230 extends opposite the hollowed-out area 300, 1300 and the cavity 200.

The outer ring 231 is in tight contact at its outer periphery with the inner face 110'a. The rear face 400 constitutes at its outer periphery a bearing abutment for the front face of the outer ring 231, as can be seen in FIGS. 5 to 8. This abutment is an axial abutment of annular shape and constitutes a bearing surface for the front face of the ring 231. The inner periphery of the inner ring 232 of the bearing 230 is designed to cooperate with the outer periphery 122a of the body 122 of the starter head 120 (see FIGS. 5, 6, 8).

The ring 232 is a ring for axially guiding the body 122 of the starter head 120 when the said body moves axially and rotatably in the manner described hereinabove. Reference 233 designates the sealing means provided between the rings 231, 232 presented, in a known manner, by a sealed ball bearing. These means comprise in particular deflectors.

This bearing is filled with grease to extend its service life and to reduce friction in the bearing.

According to a particular feature, a hollowed-out area is formed in the rear face 400 of the wall 111.

The hollowed-out area 300, 1300 is set up at least for the most part radially outside the cavity 200.

Figure 3:
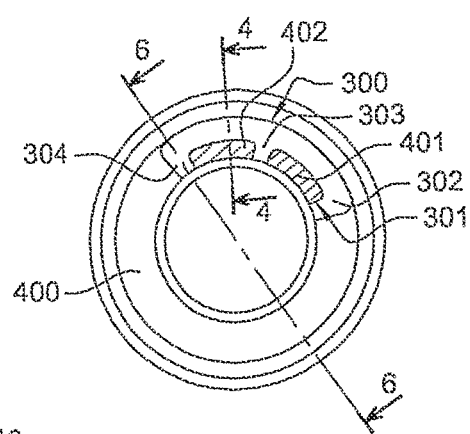
FIG. 3 is a partial view on a larger scale of the central part of FIG. 2 showing the grease supply.
Figure 4:
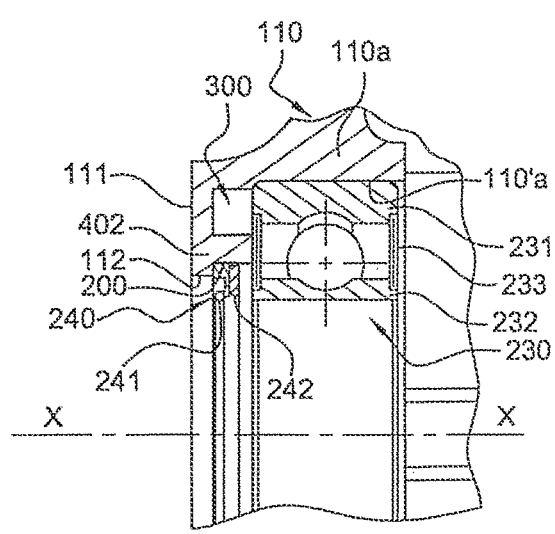
FIG. 4 is a half sectional view on line 4-4 of FIG. 3 showing the bearing of FIGS. 2 and 3 fitted with its seal and its ball bearing.

This hollowed-out area is configured to form a grease supply filled with grease referenced 301 in FIG. 3.

The sealing means 233 of the bearing 230 prevent mixing between the grease of the bearing 230 and the grease 301 of the hollowed-out area. Each grease is therefore chosen according to the functions to be performed. In this case the grease 301 is different from the grease of the sealed bearing 230.

At least one passage for grease exists between the hollowed-out area and the front face of the bearing 230 for access of the grease to the cavity 200 and to the outer periphery 122a of the body 122.

The grease 301 cannot escape towards the front or to the outside due to the presence of the seal 240, which thus has an additional function. The grease 301 lubricates the sliding contact between the body 122 of the starter head 120 and the inner ring 231 of the bearing 230. The grease 301 forms a lubricating film at the outer periphery 122a of the body 122. This film protects the body 122 against corrosion and facilitates the sliding of the body 122 in the inner ring 232 of the bearing 230.

The seal 240 prevents the penetration of dust or water loaded with corrosive elements or any other contamination into the bearing 110. The seal 240 cleans the body 122.

In all of the Figures a functional axial clearance exists between the rear face 400 and the sealing means 233.

The outside diameter of the inner ring 232 of the bearing 230 is less than the diameter of the inner face of the axially oriented portion of the cavity 200 so that no contact is made between the front face of the inner ring 232 and the rear face 400 of the transverse wall 111.

In the first preferred embodiment of FIGS. 2 to 6 the hollowed-out area 300, filled with grease 301, includes at its inner periphery three radial channels 302, 303, 304 providing access to the cavity 200 and to the outer periphery 122a of the body 122 so as to distribute a quantity of grease and therefore of lubricant throughout the life of the starter. The channels 302, 303 and 304 constitute the grease passage referred to hereinabove and are delineated by the front face of the bearing 230, In this embodiment the hollowed-out area 300 is formed at the outer periphery of the rear face 400 so that the bearing contact of the front face of the outer ring 231 is interrupted locally.

The hollowed-out area 300 is set up for the most part outside the cavity 200. It is of annular shape (FIGS. 3 and 4) and extends circumferentially through 120° so as to contain a sufficient quantity of grease while at the same time providing a good bearing surface for the front face of the outer ring 231 of the bearing 230.

Figure 2:
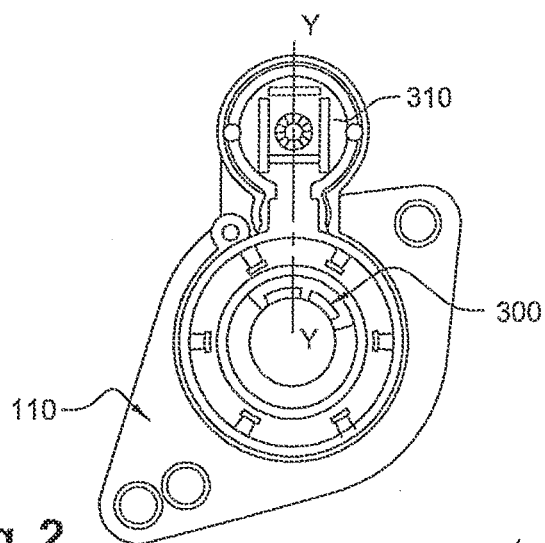
FIG. 2 is a view of the rear face of a front bearing section of a housing of a starter with output pinion provided with a grease supply according to the invention.

It is set up preferably in the upper vertical position in relation to the axis Y-Y in FIG. 2, which shows the housing in its position of attachment on a fixed part of the motor vehicle. The hollowed-out area 300 is therefore formed in the upper portion of the face 400 so that the grease can descend by gravity.

The hollowed-out area 300 therefore affects the rear face 400 closest to the outer periphery of the bearing 110. This outer periphery is provided with a cavity 310 in the housing serving as a receptacle for the movable core of the electromagnetic contactor.

In a variant the hollowed-out area is offset circumferentially relative to the axis Y-Y in FIG. 2.

Two bands of material 401, 402 in the shape of an annular sector are disposed at the inner periphery of the hollowed-out area and delineate internally the hollowed-out area 300. These bands 401, 402 delineate the channels 302, 303, 304 with the lateral edges of the hollowed-out area 300.

Not taking into account the channels 302, 303, 304, the hollowed-out area 300 therefore extends radially outside the cavity 200. The channels 302, 303, 304 locally affect the rear end of the cavity 200 in the manner described below.

Thus the first circumferential ends opposite the bands 401, 402 delineate the radial channel 303. The radial channel 304 is delineated by the second circumferential end of the band of material 402 and by the first lateral edge of circumferential end of the hollowed-out area 300, while the radial channel 302 is delineated by the second circumferential end of the band 401 and by the second lateral edge of circumferential end of the hollowed-out area.

The channels emerge into the cavity 200, which is notched locally to the rear as can be seen in FIG. 6.

The channels 302 to 304 are of axial length corresponding (FIG. 6) to the axial clearance J, which exists between the rear face of the seal 240, that is to say the rear face of the metal reinforcing washer 242, and the front face of the bearing 230.

The radial channels emerge at the rear face of the seal 240 for access of the grease 301 to the front face of the inner ring 232 and to the outer periphery 122a of the body 122.

The rear end of the cylindrical portion of the wall 111 delineating the cavity is therefore notched for forming the channels 302, 303, 304.

In the second embodiment of the invention (FIGS. 7 and 8) the hollowed-out area 1300 consists of an annular groove formed in the face 400.

This groove is disposed radially opposite the sealing means 233 of the bearing 230 and outside the cavity 200 notched locally so as to form radial channels 1303 for access to the outer periphery 122a of the body 122. The clearance J exists, as shown in FIG. 6, between the front face of the bearing 230 and the rear face of the seal 240, the cavity 200 being notched locally at the rear so as to form channels 1303.

The bearing contact of the front face of the ring 231 on the annular rear face 400 is continuous.

In a variant the axial length of the cavity 200 is substantially equal to the thickness, measured axially, of the seal 240 so that the channels 1003 are continuous and constitute an annular space of clearance J, In all embodiments this clearance J, between the bottom of the passage and the front face of the bearing, is calibrated so that the grease flows progressively by gravity at the level of the outer periphery 122a of the body 122 and between the rear face of the seal 240 and the front face of the bearing 230.

The hollowed-out area in FIGS. 2 to 8 is blind. It is open at its axial end opposite the bearing. The bottom of the hollowed-out area is closed.

The front bearing section 110 equipped with its seal 240, its bearing 230 and 20 of its grease is assembled as follows:
- in a first step the cavity and the hollowed-out area with access passage to the cavity are formed either by machining of the rear face or by casting;
- in a second step the seal 240 is mounted in its cavity 200;
- in a third step the hollowed-out area is filled with grease 301;
- in a fourth step the sealed ball bearing 230 is mounted by axially fitting the outer ring 231 in the face 110'a.

There is thus obtained a front bearing section that can be handled and transported without risk of losing the grease as the front face of the bearing is opposite the hollowed-out area filled with grease for forming a grease supply.

The other components of the starter and of the starter housing are then mounted.

It will be appreciated that the inner ring 232 of the bearing is not modified and that the formation of the hollowed-out area, in particular by casting, is economical. The ring 232 is not provided with grease supply grooves at its inner periphery and is therefore not machined unlike the inner ring described in the document U.S. Pat. No. 4,995,275.

Furthermore, it is easier to fill the hollowed-out area of the invention with grease, than to fill the grooves of the inner ring of the bearing with grease.

Also there is no risk of leakage or contamination of the grease as the bearing protects the grease supply, consisting of the grease contained in the hollowed-out area, during handling and transportation of the front bearing.

In the document U.S. Pat. No. 4,995,275 the totality of the grease is deployed from the outset of the operation of the starter and can therefore quickly become degraded and contaminated.

In the solutions according to the invention the grease flows progressively by gravity and provides lubrication and corrosion protection at the interface between main body of the starter head and the ball bearing.

The seal is simplified and is configured for access of the grease to the space delineated by the rear face of the seal and by the front face of the bearing.

It can be seen from the description and the Figures that a cavity 200 for mounting a seal 240 is formed at the inner periphery of the rear face 400 of the wall 111 and that this rear face 400, on one hand, is configured to form a bearing abutment for the outer ring 231 of a bearing 230 and, on the other hand, has at least one hollowed-out area 300, 1300 designed to be filled with grease for forming a grease supply; the said hollowed-out area being set up at least for the most part outside the cavity 200.

There also exists an axial clearance between the rear face of the seal and the front face of the bearing.

The axially oriented portion delineates the cavity and internally the hollowed-out area. This portion is interrupted by the channel or channels.

In the Figures the hollowed-out area comprises a transversely oriented bottom, of which the thickness is determined so as to have the necessary strength. In a particular embodiment, the thickness of the bottom of the hollowed-out area is equal to the thickness of the transversely oriented portion delineating the cavity 200.

The hollowed-out area has an annular shape at its inner and outer periphery. It is continuous at its outer periphery and is interrupted at its inner periphery.

In FIGS. 2 to 8, the axial length of the cavity 200 is substantially equal to or greater than the thickness of the seal.

Of course, the present invention is not limited to the example embodiments shown.

The solutions according to the invention thus make it possible to replace the ball bearing by a roller bearing, preferably of the sealed type, because the grease supply is formed in the rear face of the transverse wall.

In a variant, the channels, 302, 303, 304 are inclined relative to the radial direction.

The number of channels depends on the applications. A single local channel can be provided.

In a variant, at least two local channels are provided. To accomplish this it is simply necessary to replace the two bands of material 401, 402 by a single band of material.

In a variant, this single band of material, for example in the form of an annular sector, is connected to one of the circumferential end edges of the hollowed-out area so that a single local channel is provided.

In a variant, the number of local channels is increased by increasing the number of bands of material.

Figure 7:
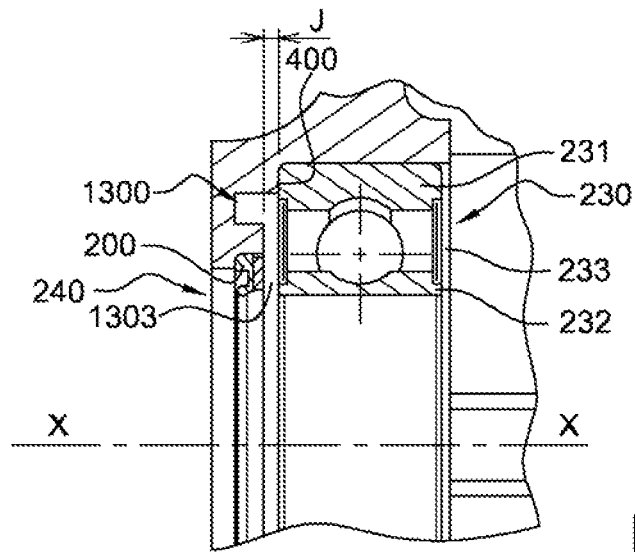
FIG. 7 is a view similar to FIG. 4 relating to a second example embodiment of the invention.
Figure 8:
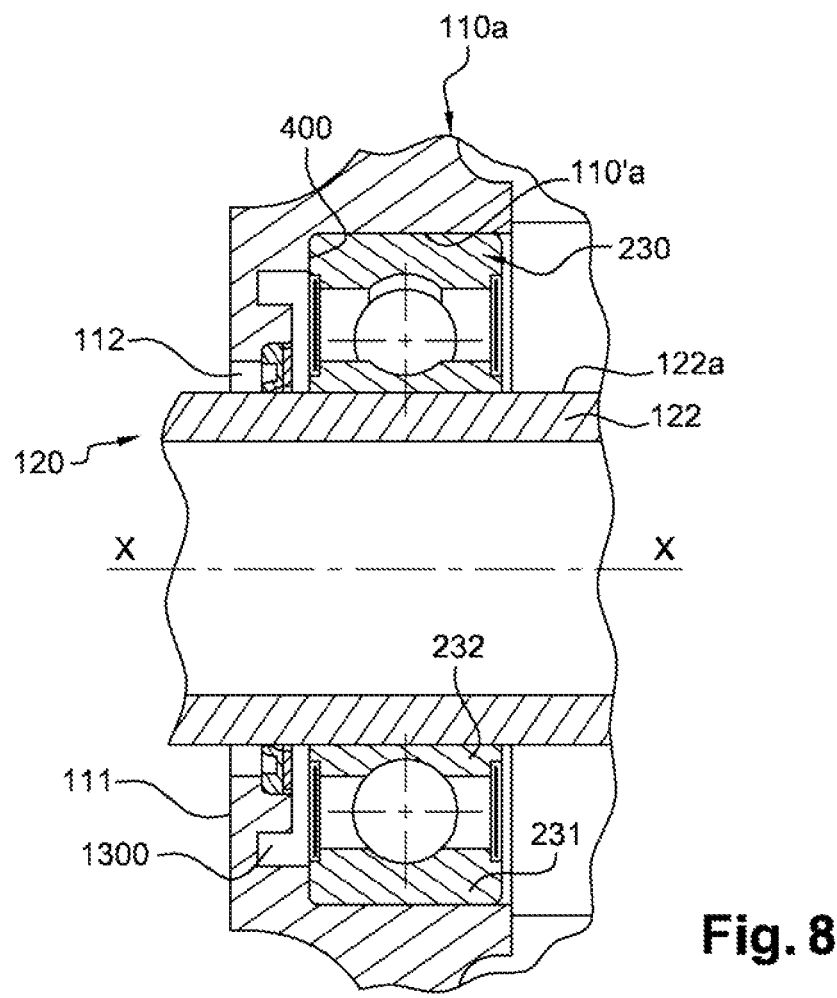
FIG. 8 is a view similar to FIG. 5 for this second example embodiment.

In a variant, this channel is circumferentially continuous and extends for example in the embodiment shown in FIGS. 7 and 8 through 360°.

In these FIGS. 7 and 8 the desired number of channels can be created.

The passage between the hollowed-out area and the cavity therefore comprises at least one channel, which in a variant is circumferentially continuous.

In a variant, the rear face of the wall 111 has two hollowed-out areas, of smaller circumferential dimensions than the hollowed-out area 300. These hollowed-out areas are for example disposed circumferentially on either side of the axis X-X in the upper part of the face 400. They extend circumferentially through less than 120°. The channel or channels associated with each hollowed-out area are radially oriented or in a variant inclined relative to the radial direction so that the grease flows towards the centre.

In a variant, the seal comprises two lips inclined axially in the opposite direction as in the document U.S. Pat. No. 4,995,275. This seal is configured so that an axial clearance larger than that in the document U.S. Pat. No. 4,995,275 exists between the lip directed towards the bearing and the front face of the bearing.

In this case the axial length of the cavity is, in a variant, less than the thickness of the seal measured axially. This length is close to the thickness of the seal.

In a variant, the bottom of the hollowed-out area(s) is inclined.

In a variant, the periphery(ies) and the bottom of the hollowed-out area(s) have another shape by the fact that the hollowed-out area(s) are in a particular embodiment obtained by casting.

The presence of the fork 1 is not necessary, the contactor may include a coil surrounding the driver of the free wheel constituting the plunger core of the contactor.

In the embodiment of FIG. 1 the electromagnetic contactor extends parallel to the electric motor of the starter and is carried by the front bearing 12. In a variant, there is provided a return device between the fork and the movable core of the starter so that in this case the contactor extends to the rear of the electric motor.

Whereas in the document FR 2 764 946 the pinion is of a single piece with the front end of the bush so that the number of teeth of the pinion is limited and the pinion is made of the same material as the bush constituting the main body of the pinion, in a variant the pinion is separate from the main body in the form of a bush of the starter head as described in the document U.S. Pat. No. 4,818,889 (FIG. 1) so that the material of the pinion can be different from that of the main body of the starter head and the number of teeth of the pinion is not limited by the diameter of the opening 112 and by the outside diameter of the main body 122.

In this case the pinion is rotatably connected to the front end, in the form of a nose, of the main body by a connection with complementary splines of axial orientation provided between the outer periphery of the nose and the inner periphery of the pinion. This connection allows an axial movement of the pinion relative to the bush. There is provided a stop to limit the axial movement of the pinion, and a stop ring to axially immobilise, the stop in combination with a play-compensating spring bearing on a shoulder of the nose to axially urge the pinion into contact with the stop. The spring is compressed during assembly of the stop and the ring. The ring is received in a seating and in a semi-cylindrical groove formed respectively in the stop and in the nose. Reference will be made to this document U.S. Pat. No. 4,818,889 for more details. In a variant the front end of the body 122 is less hard than the rest of the body and the pinion is fixed by crimping onto this front end.

As described hereinabove, the starter may or may not be equipped with a reduction gear so that the output shaft of the starter is separate from or of a single piece with the shaft of the electric motor.

In a variant, the output shaft of the starter is formed by a sleeve of the epicyclic gear interposed between a pinion of the output shaft of the electric motor of the starter and the free wheel as can be seen in FIG. 1 of the document U.S. Pat. No. 4,818,889.

In a variant, the free wheel of the starter is a conical clutch provided between the driver and the rear end of the bush as described for example in the document WO 03/002870.

The articulation of the fork can be provided in any manner, that is to say with or without a plate.

The starter can be used to drive the internal combustion engine of a passenger vehicle, a truck, a farm tractor or a boat. In a variant, the starter is a starter for a fixed internal combustion engine used for example to drive a power take-off.

It will be appreciated that the bearing surface for the outer ring of the bearing is not unduly affected by the hollowed-out area(s).

The invention claimed is:

1. A front bearing section (110) of a starter housing of a combustion engine starter (100) equipped with a starter head (120) including a main body (122) and an output pinion (121), for a motor vehicle, the front bearing section (110) of the starter housing comprising:
a transverse wall (111) at a front of the front bearing section (110), the transverse wall (111) provided with an opening (112) for the passage of the main body (122) of the starter head (120) there through, the main body (122) axially moveable relative to the front bearing section (110);
an annular cavity (200) formed in a rear face (400) of the transverse wall (111) at an inner periphery of the transverse wall (111) for mounting an annular seal (240); and
the rear face (400) of the transverse wall (111) configured to form a bearing abutment for an outer ring (231) of a bearing (230);
the rear face (400) including at least one hollowed-out area (300, 1300) designed to be filled with grease to form a grease supply;
the hollowed-out area (300, 1300) disposed generally radially outside the annular cavity (200).

2. The front bearing section according to claim 1, further comprising a cylindrical sleeve (110a) having internally an inner cylindrical face (110'a) connecting to an outer periphery of the rear face (400) of the transverse wall (111) for forming a recess, and wherein the outer ring (231) of the bearing (230) abuts the rear face (400) and in tight contact with the inner cylindrical face (110'a).

3. The front bearing section according to claim 2, wherein the annular cavity (200) is axially offset towards the front in relation to the bearing (230).

4. A front bearing section (110) of a starter housing of a combustion engine starter (100) equipped with a starter head (120) including a main body (122) and an output pinion (121), for a motor vehicle, the front bearing section (110) of the starter housing comprising:
a transverse wall (111) at a front of the front bearing section (110), the transverse wall (111) provided with an opening (112) for the passage of the main body (122) of the starter head (120) there through, the main body (122) axially moveable relative to the front bearing section (110);
an annular cavity (200) formed in a rear face (400) of the transverse wall (111) at an inner periphery of the transverse wall (111) for mounting an annular seal (240); and
the rear face (400) of the transverse wall (111) configured to form a bearing abutment for an outer ring (231) of a bearing (230);
the rear face (400) including at least one hollowed-out area (300, 1300) designed to be filled with grease to form a grease supply;
the hollowed-out area (300, 1300) disposed generally radially outside the annular cavity (200);
wherein the bearing (230) is sealed, and wherein at least one radial channel (302, 303, 304, 1303) extending radially between the annular cavity (200) and the hollowed-out area (300, 1300) for the grease exists between the hollowed-out area (300, 1300) and a front face of the bearing (230) facing the rear face (400) of the transverse wall (111).

5. The front bearing section according to claim 4, wherein the hollowed-out area (300) is formed at the outer periphery of the rear face (400) of the transverse wall (111) and affects locally the bearing contact of the outer ring (231) of the bearing (230) on the said rear face (400).

6. The front bearing section according to claim 5, wherein the radial channel for the grease comprises at least two radial channels, and wherein the hollowed-out area (300) is delineated internally by at least one band of material defining with lateral edges of the hollowed-out area (300) the two radial channels.

7. The front bearing section according to claim 6, wherein the hollowed-out area (300) is delineated internally by two bands of material (401, 402), wherein each band of material defines with one of the lateral edges of the hollowed-out area (300) the radial channel (302, 304), and wherein a third radial channel (303) is present between circumferential ends opposite the two bands of material (401, 402).

8. The front bearing section according to claim 6, wherein the hollowed-out area (300) extends circumferentially substantially through 120°.

9. The front bearing section according to claim 8, wherein the hollowed-out area (300) is formed in an upper portion of the inner face (400) of the transverse wall (111) closest to an outer periphery (310) of the front bearing section (110).

10. The front bearing section according to claim 4, wherein the hollowed-out area (1300) consists of an annular groove (1300), and wherein the radial channel (1303) comprises one or more radial channels.

11. The front bearing section according to claim 10, wherein the one or more radial channels (302, 303, 304-1303) emerge at a rear of the cavity (200), which is delineated by an axially oriented portion of the transverse wall (111), and wherein the axially oriented portion of the transverse wall (111) is notched locally at the rear by the radial channel or radial channels.

12. The front bearing section according to claim 11, wherein the cavity (200) is of axial orientation and is equipped with the annular seal (240) comprising at least one lip inclined towards the front and including at the front an elastomer portion comprising the lip and at the rear a reinforcing washer (242), and wherein an axial length of the cavity (200) is greater than or equal to a thickness of the annular seal (240).

13. The front bearing section according to claim 11, wherein the cavity (200) is of axial orientation and is equipped with the seal (240) comprising at least one lip inclined towards the front and including at the front an elastomer portion comprising the lip and at the rear a reinforcing washer (242), and wherein an axial length of the cavity (200) is greater than or equal to a thickness of the annular seal (240).

14. The front bearing section according to claim 13, wherein the bearing is a sealed ball bearing provided with an inner ring (232), and wherein the radial channel or radial channels emerge at the rear face of the annular seal (240) for access of the grease (301) to the front face of the inner ring (232).

15. A combustion engine starter with output pinion (121), for a motor vehicle, comprising a housing with a front bearing section (110) and a starter head (120) having a main body (122) and an output pinion (121), the front bearing section (110) comprising:
- a transverse wall (111) at the front of the front bearing (110), the transverse wall (111) provided with an opening (112) for the passage of the main body (122) of the starter head (120) there through, the main body (122) axially moveable relative to the front bearing section (110);
- an annular cavity (200) formed in a rear face (400) of the transverse wall (111) at an inner periphery of the transverse wall (111) for mounting an annular seal (240); and
- the rear face (400) of the transverse wall (111) configured to form a bearing abutment for an outer ring (231) of a bearing (230);
- the rear face (400) including at least one hollowed-out area (300, 1300) designed to be filled with grease to form a grease supply;
- the hollowed-out area (300, 1300) disposed at least for the most part outside the annular cavity (200).

* * * * *